US011161220B2

(12) United States Patent
Ito et al.

(10) Patent No.: US 11,161,220 B2
(45) Date of Patent: Nov. 2, 2021

(54) SHOT TREATMENT DEVICE

(71) Applicant: SINTOKOGIO, LTD., Nagoya (JP)

(72) Inventors: Masakatsu Ito, Toyokawa (JP); Takuya Koyama, Toyokoawa (JP)

(73) Assignee: SINTOKOGIO, LTD., Nagoya (JP)

( * ) Notice: Subject to any disclaimer, the term of this patent is extended or adjusted under 35 U.S.C. 154(b) by 117 days.

(21) Appl. No.: 16/624,513

(22) PCT Filed: May 8, 2018

(86) PCT No.: PCT/JP2018/017788
§ 371 (c)(1),
(2) Date: Dec. 19, 2019

(87) PCT Pub. No.: WO2019/003647
PCT Pub. Date: Jan. 3, 2019

(65) Prior Publication Data
US 2021/0129290 A1    May 6, 2021

(30) Foreign Application Priority Data

Jun. 30, 2017   (JP) .............................. JP2017-129166

(51) Int. Cl.
*B24C 1/10*    (2006.01)
*B24C 9/00*    (2006.01)
(Continued)

(52) U.S. Cl.
CPC ................. *B24C 1/10* (2013.01); *B24C 3/20* (2013.01); *B24C 3/22* (2013.01); *B24C 9/00* (2013.01); *B24C 9/003* (2013.01); *G01N 27/72* (2013.01)

(58) Field of Classification Search
CPC .... B24C 1/10; B24C 9/00; B24C 3/22; B24C 9/003; B24C 3/20; G01N 27/72
See application file for complete search history.

(56) References Cited

U.S. PATENT DOCUMENTS 9,126,308 B2 *  9/2015  Yamamoto ................ B24C 1/10
9,163,295 B2 * 10/2015  Yamamoto ................ C21D 7/06
(Continued)

FOREIGN PATENT DOCUMENTS

CN    102248493 B    1/2013
CN    102958648 A    3/2013
(Continued)

OTHER PUBLICATIONS

Internatinal Preliminary Report on Patentability dated Jan. 9, 2020 for PCT/JP2018/017788.

*Primary Examiner* — Ryan J. Walters
(74) *Attorney, Agent, or Firm* — Faegre Drinker Biddle & Reath LLP

(57) ABSTRACT

A shot treatment device includes, a rotary table rotatable in a first rotation direction about a first rotation shaft extending along a vertical direction, a plurality of placement tables arranged at intervals in a circumferential direction on an upper surface of the rotary table, an ejector configured to eject shot media, a first inspection detector configured to inspect surface properties of a workpiece, a shot chamber in which shot media is ejected to a workpiece, and a first inspection chamber provided downstream in the first rotation direction from the shot chamber. The ejector ejects shot media to a workpiece held on a first placement table that has entered the shot chamber, and the first inspection detector capable of ascending and descending is disposed above a second placement table that has entered the first inspection chamber and inspects surface properties of a workpiece held on the second placement table.

20 Claims, 8 Drawing Sheets

(51) Int. Cl.
*B24C 3/22* (2006.01)
*B24C 3/20* (2006.01)
*G01N 27/72* (2006.01)

(56) References Cited

U.S. PATENT DOCUMENTS

| | | | | |
|---|---|---|---|---|
| 9,638,668 | B2* | 5/2017 | Makino | C21D 7/06 |
| 9,776,301 | B2* | 10/2017 | Yamamoto | B24C 1/00 |
| 10,315,287 | B2* | 6/2019 | Moriyama | F16F 1/02 |
| 2014/0360241 | A1 | 12/2014 | Yamamoto | |
| 2015/0241391 | A1 | 8/2015 | Makino et al. | |

FOREIGN PATENT DOCUMENTS

| | | |
|---|---|---|
| CN | 103201073 B | 10/2015 |
| CN | 102371543 B | 4/2016 |
| CN | 103649744 B | 9/2016 |
| CN | 106636587 A | 5/2017 |
| CN | 106415261 B | 7/2019 |
| DE | 10 2015 106 777 A1 | 11/2016 |
| EP | 3 162 501 A1 | 5/2017 |
| EP | 3 184 242 A1 | 6/2017 |
| JP | 2750895 A | 12/1990 |
| JP | H02-306875 A | 12/1990 |
| JP | H04-66863 A | 3/1992 |
| JP | 2006-512215 A | 4/2006 |
| JP | 2012-101304 A | 5/2012 |
| JP | 5569528 B2 | 8/2014 |
| JP | 5877505 B2 | 3/2016 |
| JP | 2016-43429 A | 4/2016 |
| JP | 2017-9356 A | 1/2017 |
| KR | 20110016392 A | 2/2011 |
| WO | WO-2004/058452 A2 | 7/2004 |
| WO | WO-2012/066687 A1 | 5/2012 |
| WO | WO 2013/121632 A1 | 8/2013 |
| WO | WO-2015/136737 A1 | 9/2015 |
| WO | WO-2015/198844 A1 | 12/2015 |

* cited by examiner

SHOT TREATMENT DEVICE

TECHNICAL FIELD

The present disclosure relates to a shot treatment device.

BACKGROUND ART

In the second embodiment of the following Patent Literature 1, a surface treatment device (shot treatment device) in which an inspection detector is built in a treatment chamber (shot chamber) is disclosed. Briefly described, in this surface treatment device, the inspection detector is movable, by driving of a cylinder, to a position where a gear that is a to-be-inspected object is examined, and on the outside of the inspection detector, a detector protection panel is provided to protect the inspection detector during shot peening. The detector protection panel is constituted by a fixed panel covering a side surface of the inspection detector and a movable panel covering a bottom surface of the inspection detector. The movable panel can pivot, by driving of a cylinder, about one end of the fixed panel side. The movable panel is located at a position where a lower section of the inspection detector is closed during shot peening and is located at a position where the lower section of the inspection detector is open during inspection after the shot peening.

CITATION LIST

Patent Literature

Patent Literature 1: Japanese Patent No. 5877505

SUMMARY OF INVENTION

Technical Problem

However, with the surface treatment device of the conventional art described above, in a period from loading of one gear into the treatment chamber until unloading of the gear after machining (shot peening) and inspection, another gear cannot be loaded, unloaded, machined, or inspected, which is disadvantageous in terms of cycle time. Further, with the surface treatment device of the conventional art, in addition to the inspection detector, the detector protection panel that protects the inspection detector and the mechanism that causes the movable panel of the detector protection panel to pivot need to be provided in the treatment chamber, which makes the structure inside the treatment chamber complex.

The present disclosure describes a shot treatment device that makes it possible, even with an inspection detector built in the device, to shorten a cycle time while avoiding a structure inside a shot chamber being complex.

Solution to Problem

A shot treatment device according to one aspect of the present disclosure includes a cabinet, a plurality of chambers provided in the cabinet, a rotary table provided in the cabinet and rotatable in a first rotation direction about a first rotation shaft extending along a vertical direction, a plurality of placement tables arranged at intervals in a circumferential direction on an upper surface of the rotary table, each of the plurality of placement tables being configured to receive and hold a workpiece, an ejector configured to eject shot media, and a first inspection detector configured to inspect surface properties of the workpiece. The plurality of chambers are arranged side by side around the first rotation shaft. The plurality of chambers include a shot chamber in which shot media is ejected to a workpiece and a first inspection chamber provided downstream in the first rotation direction from the shot chamber. The ejector ejects shot media to a workpiece held on a first placement table that has entered the shot chamber of the plurality of placement tables. The first inspection detector capable of ascending and descending is disposed above a second placement table that has entered the first inspection chamber of the plurality of placement tables and inspects surface properties of a workpiece held on the second placement table.

According to the above configuration, in the cabinet, the plurality of chambers are arranged side by side around the first rotation shaft extending along the vertical direction, and the rotary table rotatable about the first rotation shaft is provided. A workpiece is placed and held on each of the plurality of placement tables arranged at intervals in the circumferential direction on the upper surface of the rotary table. The ejector ejects shot media to a workpiece held on the first placement table that has entered the shot chamber of the plurality of placement tables.

Here, the first inspection detector capable of ascending and descending is disposed above the second placement table that has entered the first inspection chamber provided downstream in the first rotation direction from the shot chamber and inspects surface properties of a workpiece held on the second placement table.

As described above, in a period from loading of one workpiece onto one of the placement tables until unloading of the workpiece from the placement table after ejection processing and inspection, another workpiece can be loaded and unloaded, and subjected to ejection processing and inspection. Further, since the inspection of the surface properties of the workpiece is performed in the first inspection chamber other than the shot chamber, it is not necessary to make the structure inside the shot chamber complex.

The shot treatment device according to one embodiment may further include a second inspection detector configured to inspect the surface properties of the workpiece. The plurality of chambers may further include a second inspection chamber provided upstream in the first rotation direction from the shot chamber. The second inspection detector capable of ascending and descending may be disposed above a third placement table that has entered the second inspection chamber of the plurality of placement tables and inspect surface properties of a workpiece held on the third placement table.

According to the above configuration, the second inspection detector inspects the surface properties of the workpiece held on the third placement table that has entered the second inspection chamber. Since the second inspection chamber is provided upstream in the first rotation direction from the shot chamber, it is possible to inspect the surface properties of the workpiece before being subjected to the ejection.

The shot treatment device according to the one embodiment may further include a blower provided in the first inspection chamber and capable of blowing gas toward the workpiece held on the second placement table.

According to the above configuration, even when shot media and dust adhere to the workpiece, it is possible to blow off the shot media and dust by gas blown from the blower to the workpiece, allowing the surface properties of the workpiece to be inspected with high accuracy.

In the shot treatment device according to the one embodiment, the blower may be installed at a position allowing gas to be blown toward the first inspection detector.

According to the above configuration, even when dust adheres to the first inspection detector, the dust can be blown off by gas blown from the blower, making it possible to prevent dust from accumulating in the first inspection detector. As a result, the first inspection detector is kept in a state with high inspection accuracy (almost the same state as an initial state), so that the surface properties of the workpiece can be inspected with higher accuracy.

The shot treatment device according to the one embodiment may further include a dust collector configured to suck in air containing dust in the cabinet.

According to the above configuration, dust and the like are blown off from the workpiece by gas blown from the blower, and the dust and the like thus blown off are sucked in by the dust collector together with the air. This allows the surface properties of the workpiece to be inspected with higher accuracy.

The shot treatment device according to the one embodiment may further include an ascending and descending mechanism configured to cause the first inspection detector to ascend and descend together with an adapter connected to the first inspection detector.

According to the above configuration, since the first inspection detector and the adapter ascend and descend together, detection performance of the first inspection detector can be maintained with a simple configuration.

In the shot treatment device according to the one embodiment, the adapter may be disposed above the rotary table and close to the first rotation shaft.

According to the above configuration, since the adapter is disposed above the rotary table and close to the first rotation shaft, maintenance work on an inner surface side of the first inspection chamber is easily performed, for example.

In the shot treatment device according to the one embodiment, the blower may be disposed outside the rotary table in plan view.

According to the above configuration, the adapter is disposed above the rotary table and close to the first rotation shaft, whereas the blower is disposed outside the rotary table in plan view. This makes it possible to prevent gas blown out from the blower from being obstructed by the adapter.

In the shot treatment device according to the one embodiment, a nozzle of the blower may be fixed to the adapter.

According to the above configuration, since the nozzle of the blower ascends and descends together with the adapter, it is possible to effectively use a space in the first inspection chamber.

The shot treatment device according to the one embodiment may further include a conveying device configured to convey a workpiece from an inspection area defined outside the cabinet to a placement position, and a residual stress measuring device configured to measure a residual stress on a surface of a workpiece placed in the inspection area. The plurality of chambers may further include a loading chamber for use in loading of a workpiece into the cabinet. The placement position may be a position on a fourth placement table located in the loading chamber of the plurality of placement tables. The first inspection detector may detect electromagnetic properties of a workpiece.

According to the above configuration, the conveying device conveys a workpiece from the inspection area defined outside the cabinet to the placement position on the fourth placement table located in the loading chamber, and the residual stress measuring device measures a residual stress on a surface of a workpiece placed in the inspection area. On the other hand, the first inspection detector detects electromagnetic properties of a workpiece. This allows the electromagnetic properties of a workpiece to be detected and the residual stress on a surface of a workpiece to be measured.

The shot treatment device according to the one embodiment may further include a first placement part on which a workpiece before being loaded into the cabinet is placed, and a second placement part on which a workpiece unloaded from the cabinet is placed. The plurality of chambers may further include an unloading chamber used to unload a workpiece from the cabinet. The conveying device may load a workpiece from the first placement part into the cabinet and place the workpiece on the fourth placement table, and unload a workpiece whose electromagnetic properties have been inspected by the first inspection detector from a fifth placement table located in the unloading chamber of the plurality of placement tables and place the workpiece on the second placement part. The residual stress measuring device includes a first residual stress measuring device configured to measure a residual stress on a surface of a workpiece placed on the first placement part, and a second residual stress measuring device configured to measure a residual stress on a surface of a workpiece placed on the second placement part.

According to the above configuration, the residual stress on the surface of the workpiece before being loaded into the cabinet is measured. Further, the residual stress on the surface of the workpiece unloaded from the cabinet is measured. This allows the residual stresses on the surface of the workpiece before and after being subjected to the ejection.

In the shot treatment device according to the one embodiment, each of the plurality of placement tables may be rotatable about a second rotation shaft parallel to the first rotation shaft.

Advantageous Effects of Invention

The shot treatment device according to the present disclosure makes it possible, even with the inspection detector built in the device, to shorten a cycle time while avoiding a structure inside the shot chamber being complex.

DESCRIPTION OF EMBODIMENTS

A shot peening device serving as a shot treatment device according to one embodiment of the present disclosure will be described with reference to FIGS. 1 to 8. Note that an arrow FR shown as appropriate in the diagrams indicates a front side in device front view, an arrow UP indicates an upper side, and an arrow LH indicates a left side in device front view. Further, in FIGS. 5 to 8, for convenience sake, hatching representing a cut surface of a panel will be omitted.

(Configuration of Shot Peening Device)

Figure 1:
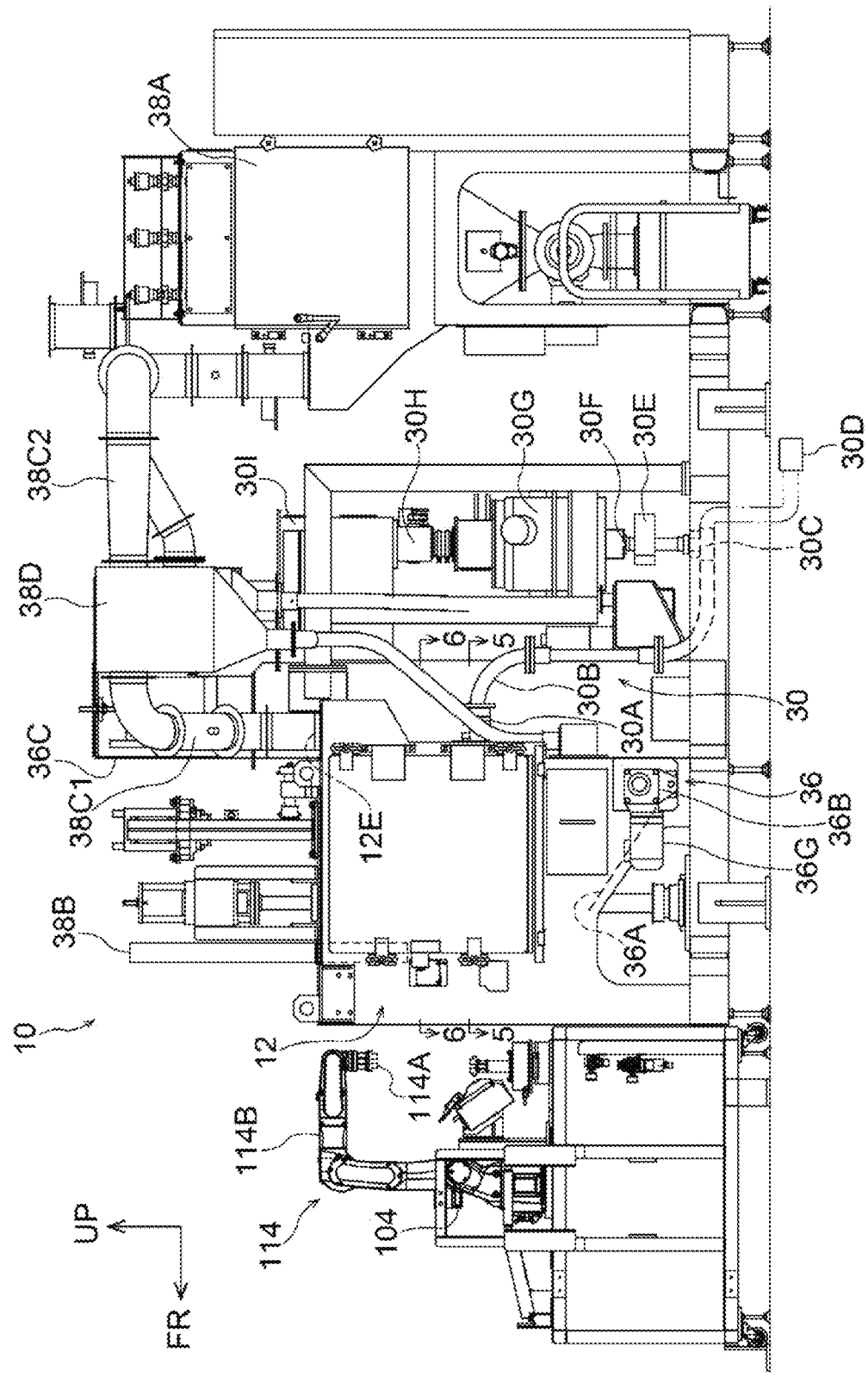
FIG. 1 is a right side view showing a shot peening device according to one embodiment.
Figure 2:
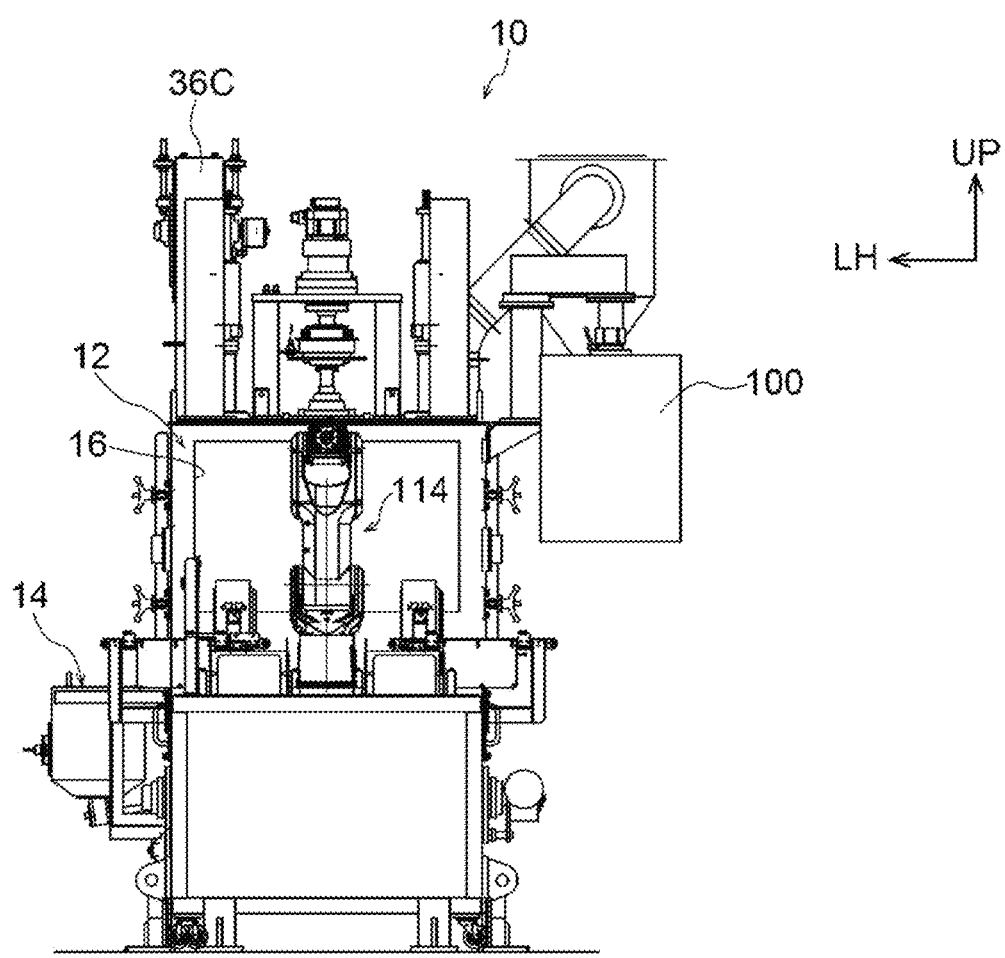
FIG. 2 is a front view showing the shot peening device according to the one embodiment.
Figure 3:
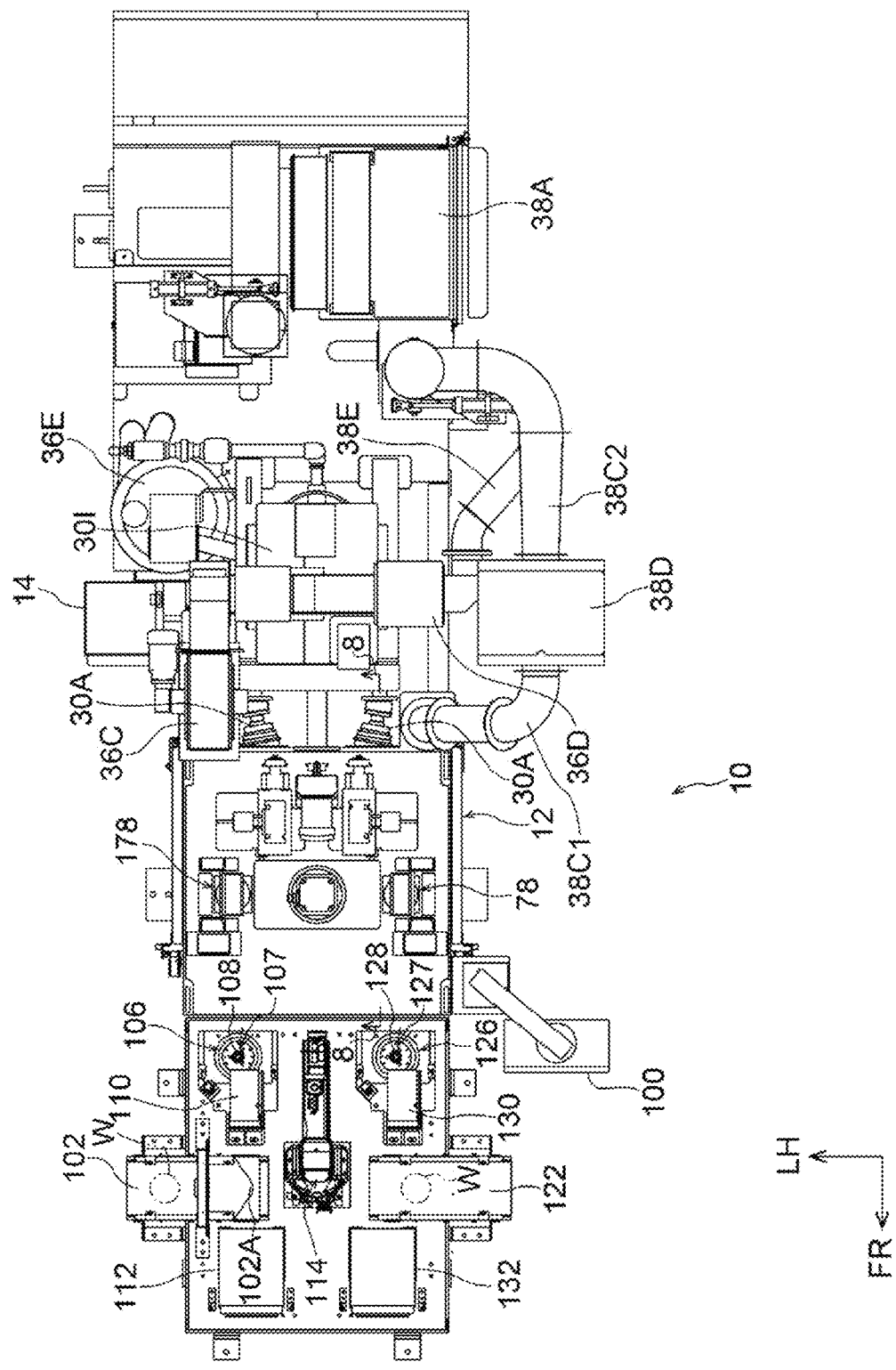
FIG. 3 is a plan view showing the shot peening device according to the one embodiment.
Figure 4:
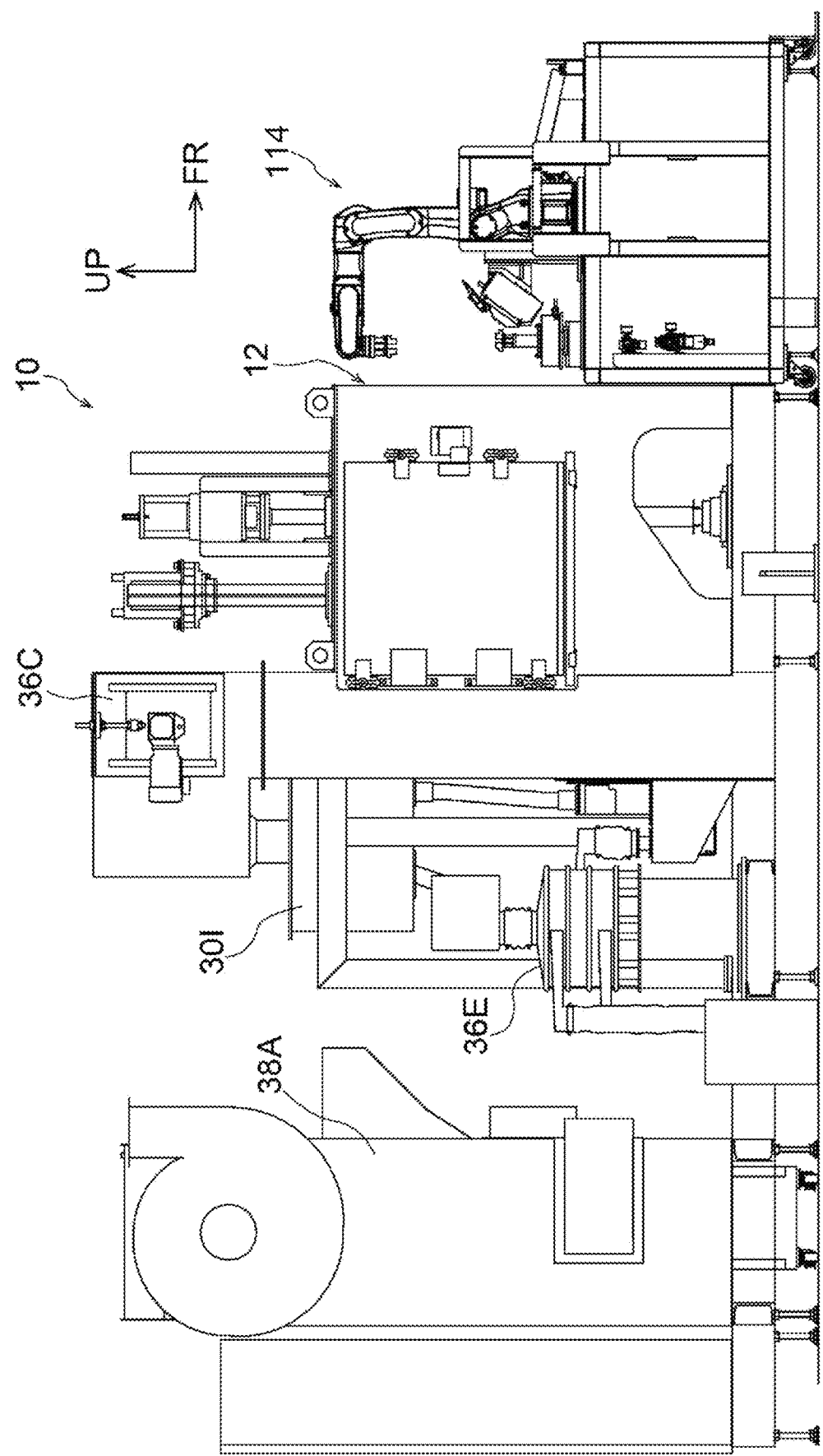
FIG. 4 is a left side view showing the shot peening device according to the one embodiment (illustration of a duct is omitted).

FIG. 1 is a right side view showing the shot peening device according to the one embodiment. FIG. 2 is a front view showing the shot peening device according to the one embodiment. FIG. 3 is a plan view showing the shot peening device according to the one embodiment. FIG. 4 is a left side view showing the shot peening device according to the one embodiment.

As shown in FIG. 1, a shot peening device 10 includes a cabinet 12 faulted in a box shape. As shown in FIG. 2, the cabinet 12 is provided with a shot media charging part 14. A charging port for charging shot media is formed on an upper section of the shot media charging part 14. The charging port is openable and closable. On the cabinet 12, a loading and unloading port 16 for loading and unloading a workpiece is formed. Note that examples of the workpiece that is subjected to shot peening may include a product such as a gear. In the present embodiment, as an example, a carburized and quenched gear made of SCM420 (chromium molybdenum steel) is used. The workpiece has a diameter of 102 mm and a height of 30 mm, for example.

An operation panel 100 is provided on a right side of the cabinet 12. A control panel includes the operation panel 100 and a storage unit. The storage unit stores a control processing program of the shot peening device 10. The shot peening device 10 operates under control of the program executed in accordance with an operation made on the operation panel 100 by an operator.

Figure 5:
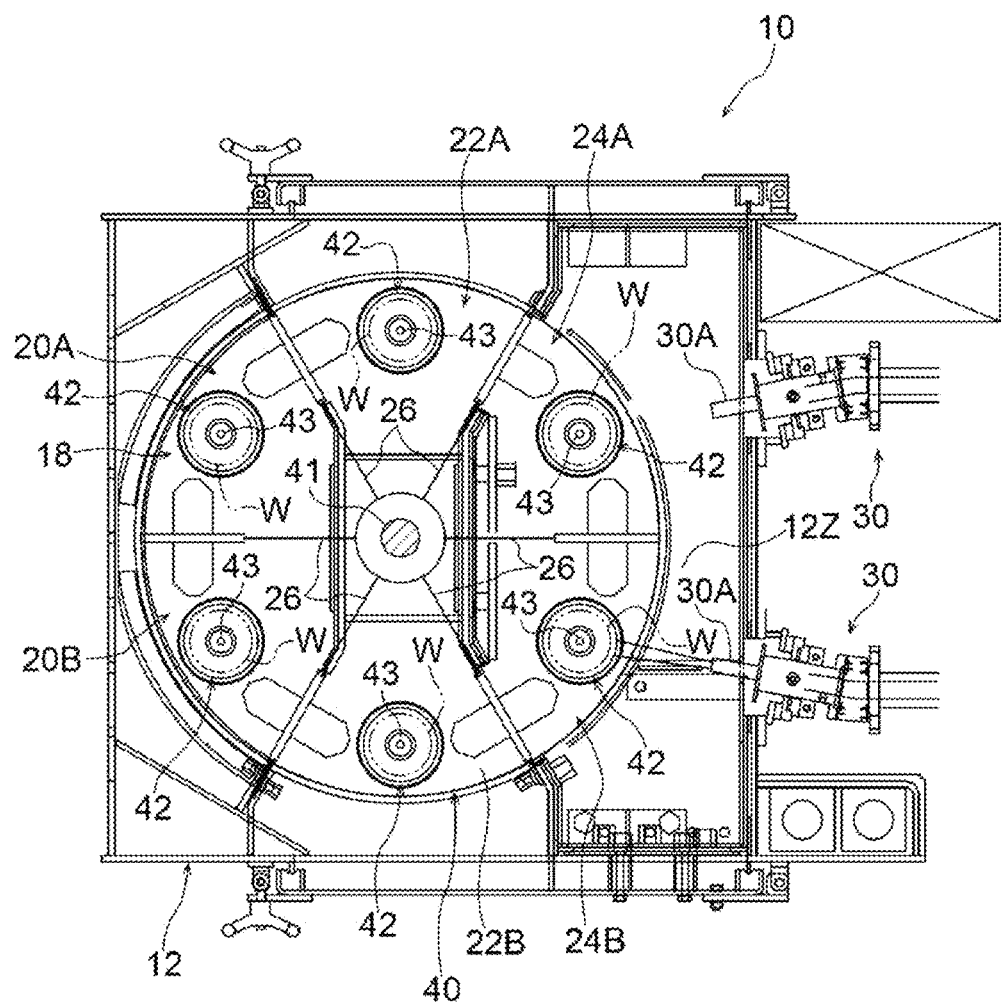
FIG. 5 is an enlarged cross-sectional view taken along line 5-5 of FIG. 1.
Figure 6:
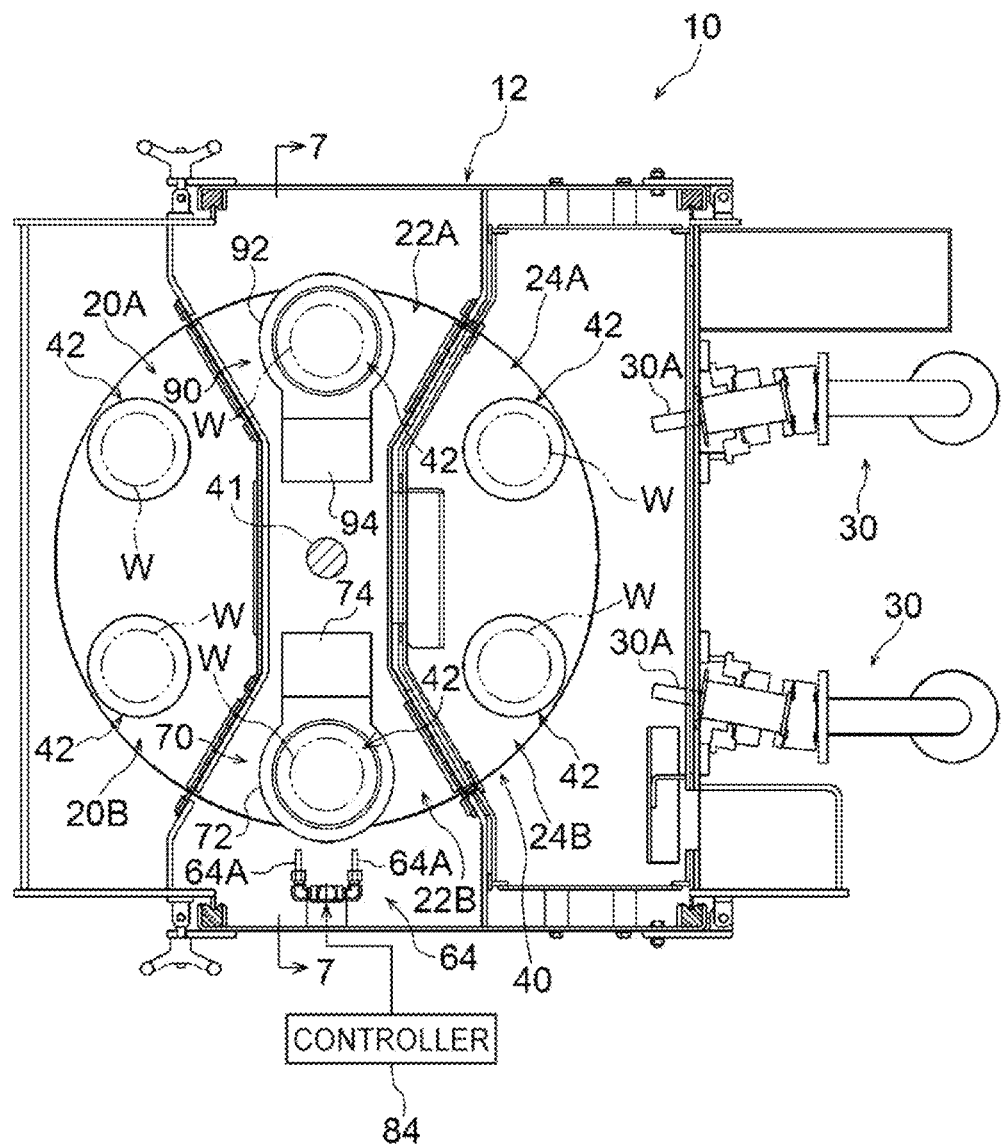
FIG. 6 is an enlarged cross-sectional view taken along line 6-6 of FIG. 1.

FIG. 5 is an enlarged cross-sectional view taken along line 5-5 of FIG. 1. FIG. 6 is an enlarged cross-sectional view taken along line 6-6 of FIG. 1. As shown in FIG. 5, a plurality of chambers are provided in the cabinet 12. The plurality of chambers include a loading chamber 20A, an unloading chamber 20B, an inspection chamber 22A (second inspection chamber), an inspection chamber 22B (first inspection chamber), a shot chamber 24A, and a shot chamber 24B. In a rear section of an inside of the cabinet 12, two shot chambers 24A and 24B are provided side by side. In a front section of the inside of the cabinet 12, the loading chamber 20A and the unloading chamber 20B are provided side by side. In the cabinet 12, the inspection chamber 22A is provided between the loading chamber 20A and the shot chamber 24A, and the inspection chamber 22B is provided between the shot chamber 24B and the unloading chamber 20B.

The loading chamber 20A, the inspection chamber 22A, the shot chamber 24A, the shot chamber 24B, the inspection chamber 22B, and the unloading chamber 20B are arranged (arranged side by side) in that order around (in a circumferential direction of) a rotation shaft 41 extending in a vertical direction. The loading chamber 20A, the inspection chamber 22A, the shot chamber 24A, the shot chamber 24B, the inspection chamber 22B, and the unloading chamber 20B are each partitioned by a partition 26 having a wallplate shape. Each of the chambers may be called a station. In other words, a multi-station equally divided in the circumferential direction is formed in the cabinet 12.

The loading chamber 20A is a chamber for use in loading of a workpiece W into the cabinet 12. The unloading chamber 20B is a chamber for use in unloading of the workpiece W from the cabinet 12. The inspection chamber 22A is a chamber for use in inspection of surface properties of the workpiece W before being subjected to shot peening. The inspection chamber 22B is a chamber for use in inspection of the surface properties of the workpiece W after being subjected to shot peening. The shot chambers 24A and 24B are chambers in which the shot media is ejected to the workpiece W. In a lower section of the inside of the cabinet 12, a product placement part 18 is provided on which the workpiece W is placed. Details of the product placement part 18 will be described later.

The shot peening device 10 includes a pair of injectors (also referred to as a "pneumatic accelerator" and regarded as "a unit of an air shot peening machine") 30 provided at the rear of the cabinet 12. A total of two injectors 30 are provided, one for the shot chamber 24A, and the other for the shot chamber 24B. The two injectors 30 have the same configuration except for arrangement position; thus, the same reference numerals are assigned to the injectors 30. Each of the injectors 30 includes a nozzle 30A, a piping part 30B, a mixing valve 30C, an air supplier 30D, a flow regulator 30E, a cut gate 30F, a pressure tank 30G, a shot gate 30H, and a shot media tank 30I.

The nozzles 30A of each of the injectors 30 is inserted through a back surface of the cabinet 12, and a tip of the nozzle 30A is directed toward the inside of the cabinet 12. Each of the injectors 30 is configured to inject (eject in a broad sense) compressed air including the shot media from the nozzle 30A to cause the shot media to impact on the workpieces W located in the shot chambers 24A and 24B. Note that, in the present embodiment, as the shot media, a conditioned cut wire having a Vickers hardness of 700 HV and a particle diameter of 0.6 mm is used, for example.

The nozzle 30A is connected to the mixing valve 30C via the piping part 30B shown in FIG. 1. The mixing valve 30C is connected to the air supplier 30D (shown as a block in the drawing) and is connected to the pressure tank 30G via the flow regulator 30E and the cut gate 30F in this order. The mixing valve 30C mixes the shot media supplied through the flow regulator 30E and the compressed air supplied from the air supplier 30D. The pressure tank 30G is connected to the shot media tank 30I via the shot gate 30H and the like disposed above the pressure tank 30G The shot media tank 30I is disposed above the shot gate 30H.

On the other hand, the shot peening device 10 includes a circulator 36. The circulator 36 is a device that circulates the shot media by conveying the shot media injected from the nozzle 30A (see FIG. 5) of each of the injectors 30 back to the shot media tank 30I. The circulator 36 includes a hopper 36A, a lower screw conveyor 36B, a bucket elevator 36C, a separator 36D, a vibration sieve 36E, and a drive motor 36G The hopper 36A is a device for use in collection of the shot media under the shot chambers 24A and 24B (see FIG. 5). The lower screw conveyor 36B is provided at a lower end of the hopper 36A. The lower screw conveyor 36B is connected to the drive motor 36G.

The lower screw conveyor 36B is horizontally disposed with a left-right direction (a direction perpendicular to a paper surface of FIG. 1) as a longitudinal direction of the lower screw conveyor 36B. The lower screw conveyor 36B is configured to rotate about a shaft to convey the shot media flowing down from the hopper 36A to a device left side (a back side of FIG. 1). An end on a conveyance downstream side of the lower screw conveyor 36B is disposed facing a lower collecting part of the bucket elevator 36C.

The bucket elevator 36C includes a pair of pulleys (not shown), an endless belt (not shown), and a plurality of buckets (not shown), and detailed description of the bucket elevator 36C will be omitted because such a bucket elevator is known. The pair of pulleys are arranged at upper and lower sections of the shot peening device 10. Each of the pulleys is motor-driven to rotate. The endless belt is wound between the pair of pulleys. The plurality of buckets are attached to the endless belt. With this configuration, the bucket elevator 36C causes the buckets to scoop up the shot media dropped to a device lower section and collected by the lower screw conveyor 36B and rotates the pulleys to convey the shot media and the like in the buckets from the device lower section to a device upper section (to above the cabinet 12).

As shown in FIG. 3, the separator 36D of a winnowing type is connected to an upper end of the bucket elevator 36C via piping. To the separator 36D, the shot media conveyed to the upper end of the bucket elevator 36C is poured through the piping. The separator 36D is connected to an air suction part (blower) of a dust collector 38A via ducts 38E and 38C2. The dust collector 38A is a device for use in collection of foreign matters (impurities) such as fine powder mixed in the shot media. The dust collector 38A draws in air by suction to cause the separator 36D to classify the shot media. The separator 36D communicates with the shot media tank 301, and causes only appropriate shot media that results from classifying the conveyed shot media to flow to the shot media tank 301.

As shown in FIG. 4, the vibration sieve 36E is connected to the shot media tank 301 via a piping part and the like. An excess of shot media that cannot be stored in the shot media tank 301 flows to the vibration sieve 36E. The vibration sieve 36E includes a wire mesh for sieving the shot media. The vibration sieve 36E is disposed so as to vibrate the wire mesh to classify the shot media depending on the size of the shot media and return only shot media having an appropriate size into the cabinet 12.

On the other hand, as shown in FIG. 1, a ventilator 38B (ventilation device) for taking outside air is disposed above the front side of the cabinet 12. A duct 38C1 is connected to a suction port 12E formed on an upper section of a rear side of the cabinet 12 (close to the shot chamber 24B shown in FIG. 5). Dust generated in the cabinet 12 by shot peening is sucked in through the suction port 12E of the cabinet 12. A settling chamber (separator in a broad sense) 38D is interposed between the duct 38C1 and the duct 38C2:

The settling chamber 38D generates a classifying flow in air containing dust drawn in by suction to separate particles present therein. The settling chamber 38D is connected to a flow path extending toward a lower section of the bucket elevator 36C. Shot media separated by the settling chamber 38D is made to flow to a lower end of the bucket elevator 36C for reuse. As shown in FIG. 3, the dust collector 38A is connected to the duct 38C2. The dust collector 38A sucks in air containing dust in the cabinet 12 through the duct 38C1, the settling chamber 38D, and the duct 38C2, filters out the dust contained in the air passing through the duct 38C1, the settling chamber 38D, and the duct 38C2, and discharge only air to a device outside.

Next, the product placement part 18 shown in FIG. 5 will be described.

The product placement part 18 includes a large table 40 (rotary table) having a disk shape and a plurality of (in the present embodiment, six) small tables 42 (placement tables). The plurality of small tables 42 are annularly arranged on an outer periphery side of an upper surface of the large table 40 at uniform intervals in a circumferential direction of the large table 40. That is, the product placement part 18 has a so-called multi-table structure. The large table 40 is rotatable (revolvable) about the rotation shaft 41 (first rotation shaft) extending along the vertical direction. Each of the plurality of small tables 42 is smaller in diameter than the large table 40. Each of the small tables 42 is rotatably (axially rotatably) held on the large table 40. On each of the small tables 42, the workpiece W is placed and held. A rotation shaft 43 (second rotation shaft) of each of the small tables 42 is parallel to the rotation shaft 41 of the large table 40.

As the large table 40 rotates, the plurality of small tables 42 cyclically moves from one station to another in the order of the loading chamber 20A, the inspection chamber 22A, the shot chamber 24A, the shot chamber 24B, the inspection chamber 22B, and the unloading chamber 20B. The injectors 30 eject the shot media toward the workpieces W held on small tables 42 (first placement tables) that have entered the shot chambers 24A and 24B of the plurality of small tables 42. Note that, in the partition 26, a cutout or the like is formed to allow each small table 42 and the workpiece W to pass through when the large table 40 rotates. Further, in the cabinet 12, a plurality of holes (not shown) through which the shot media passes are formed through a sheet member 12Z disposed around the large table 40.

Figure 8:
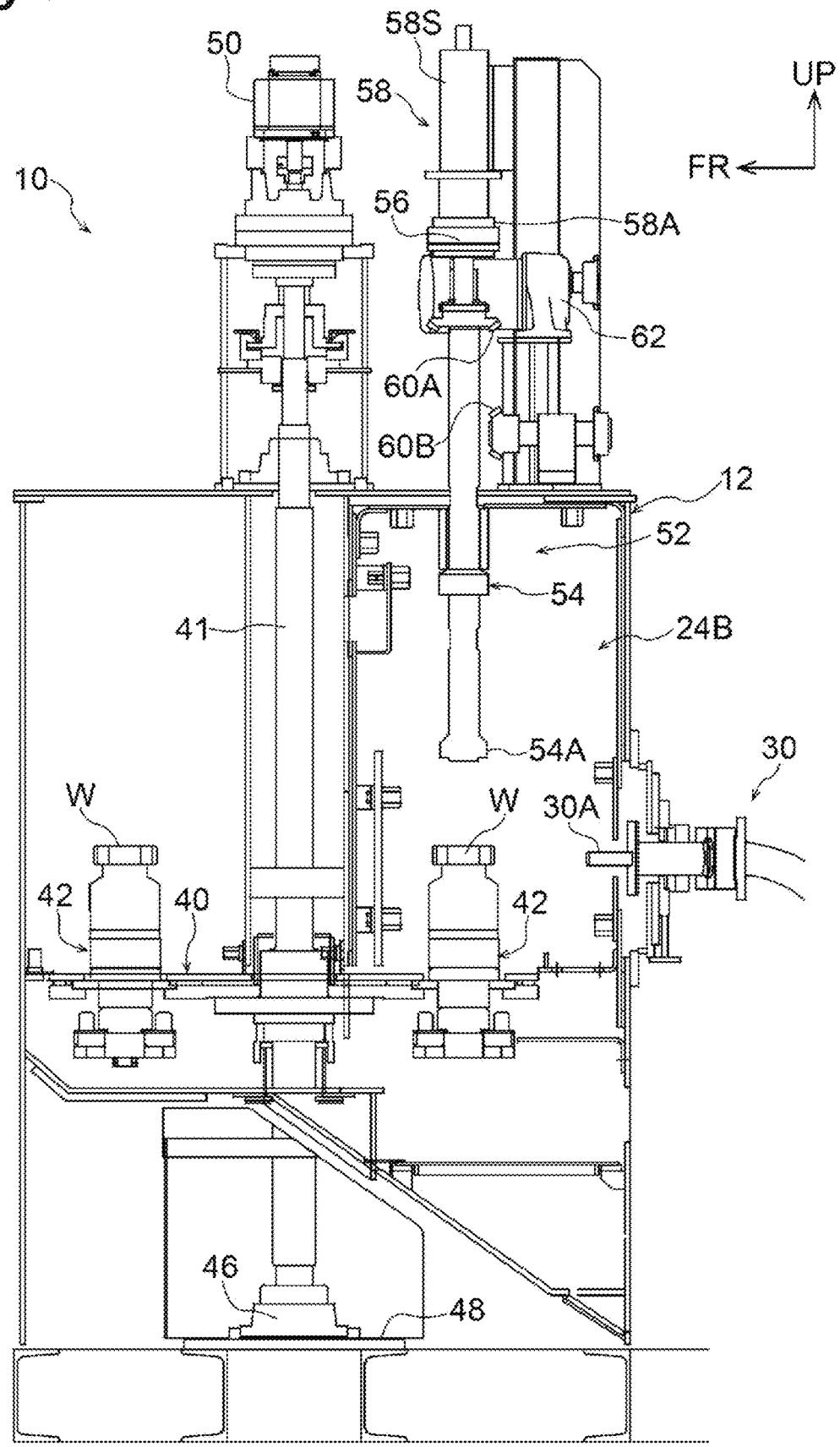
FIG. 8 is an enlarged cross-sectional view taken along line 8-8 of FIG. 3.

FIG. 8 is an enlarged cross-sectional view taken along line 8-8 of FIG. 3. As shown in FIG. 8, a lower end of the rotation shaft 41 of the large table 40 is disposed on a base 48 via a bearing part 46. An upper end of the rotation shaft 41 of the large table 40 is connected to an indexing device 50 (an element regarded as a "rotation drive mechanism" in abroad sense) via a coupling.

A known indexing device is applied as the indexing device 50; thus, detailed illustration thereof will be omitted. The indexing device 50 includes a brake-equipped drive motor for use in intermittent feed of the large table 40, a positioning clamp for use in positioning of the large table 40, and a positioning cylinder for use in actuation of the positioning clamp. This configuration causes the indexing device 50 to rotate the large table 40 about the rotation shaft 41 each time by a rotation angle (60° in the present embodiment) set in accordance with the arrangement of the small tables 42. That is, the indexing device 50 intermittently feeds the large table 40 by the rotation angle set in accordance with the positions of the small tables 42 to rotate the large table 40. In a state where the indexing device 50 temporarily stops the large table 40 (in a state where the large table 40 is at a stop position of revolution), as shown in FIG. 5, the loading chamber 20A, the inspection chamber 22A, the shot chamber 24A, the shot chamber 24B, the inspection chamber 22B, and the unloading chamber 20B each have one small table 42 disposed at a predetermined position therein.

A pressing mechanism 52 (pressing jig) shown in FIG. 8 is provided within upper sections of the shot chambers 24A and 24B. Note that, in FIG. 8, the pressing mechanism 52 provided in the shot chamber 24B is illustrated, but the same pressing mechanism as the pressing mechanism 52 is also provided in the shot chamber 24A (see FIG. 5). The pressing mechanism 52 includes a pressing part 54A for pressing the workpiece W on the small table 42 from above. The pressing part 54A constitutes a lower end of the pressing shaft 54 constituted by a plurality of shafts connected in series. An upper end of the pressing shaft 54 is supported by a bearing 56. The pressing shaft 54 cannot move relative to the bearing 56 in the vertical direction, but is rotatable about the pressing shaft 54 relative to the bearing 56. This allows the pressing part 54A to rotate together with the pressing shaft 54 about an axis extending along the vertical direction.

The bearing 56 is fixed to a coupling part 58A provided at a lower end of a rod (not shown) of a cylinder mechanism 58 (an element regarded as an "ascending and descending mechanism"). As the cylinder mechanism 58, a known cylinder mechanism (for example, a mechanism substantially the same as a cylinder mechanism 78 to be described later) is used. A cylinder part 58S of the cylinder mechanism 58 is attached to a ceiling of the cabinet 12 via a member. The cylinder mechanism 58 causes the rod to advance and retract relative to the cylinder part 58S to make a change of position of the bearing 56 and the pressing shaft 54 in the vertical direction. The actuation of the cylinder mechanism 58 allows the pressing part 54A to move between a position where the workpiece W is pressed and a retraction position higher than the position.

On the other hand, a gear 60A is coaxially fixed to an outer periphery of an upper end of the pressing shaft 54. A gear 60B that can mesh (engage) with the gear 60A is provided below the gear 60A. The gear 60B transmits a rotational driving force to the gear 60A in a state where the gear 60B meshes (engages) with the gear 60A. The gear 60A and the gear 60B are capable of coming into contact with and separating from each other with the help of the actuation of the cylinder mechanism 58. The gear 60A is positioned to mesh with the gear 60B when the pressing part 54A reaches a position to press the workpiece W. The gear 60B is connected to a drive motor 62 (actuator in a broad sense) via a driving force transmission mechanism. That is, the drive motor 62 drives the gear 60B to rotate via the driving force transmission mechanism.

In the pressing mechanism 52, the cylinder mechanism 58 is actuated in accordance with an operation made on the operation panel 100 (see FIG. 2) by the operator to cause the pressing part 54A to descend, and press and hold the workpiece W. In a state where the pressing part 54A is pressing the workpiece W, the gear 60A fixed to the pressing shaft 54 meshes with the gear 60B. When the drive motor 62 is driven in this state, the driving force of the drive motor 62 is transmitted to the workpiece W and the small table 42 via the gear 60B, the gear 60A, and the pressing shaft 54 to cause the workpiece W and the small table 42 to rotate at a predetermined position. Note that, in the present embodiment, a rotation speed of the small table 42 is set to 40.9 rpm/60 Hz as an example.

Figure 7:
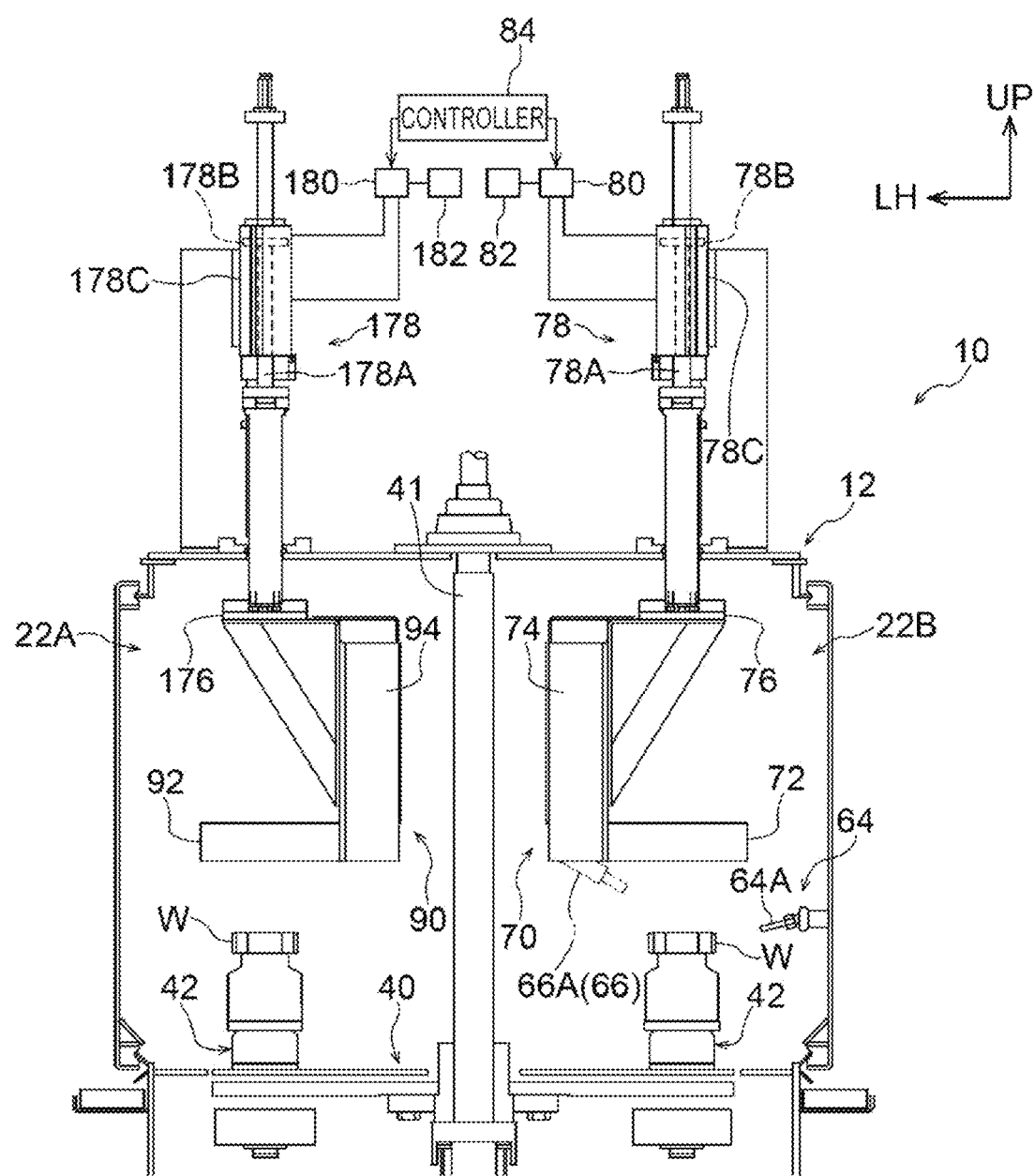
FIG. 7 is a cross-sectional view taken along line 7-7 of FIG. 6.

FIG. 7 is a cross-sectional view taken along line 7-7 of FIG. 6. As shown in FIGS. 6 and 7, in the inspection chamber 22B located downstream in a rotation direction (first rotation direction) of the large table 40 relative to the shot chambers 24A and 24B, an inspection detector 72 (first inspection detector) and a blower 64 are provided. The inspection detector 72 is also referred to as an inspection probe. That is, the inspection chamber 22B doubles as an air blow chamber in which the blower 64 is provided.

The inspection detector 72 that is capable of ascending and descending is disposed above a small table 42 (second placement table) that has entered the inspection chamber 22B of the plurality of small tables 42. The inspection detector 72 inspects the surface properties of the workpiece W held on the small table 42. The inspection detector 72 is formed in a tubular shape. The inspection detector 72 includes a coil for use in assessment of magnetism of the workpiece W and detects electromagnetic properties of the workpiece W. The coil excites an eddy current in the workpiece W.

A magnetism assessment device 70 including the inspection detector 72 shown in FIGS. 6 and 7 is installed in the cabinet 12. The magnetism assessment device 70 inspects a state of an entire surface layer of a to-be-machined portion of the workpiece W using the eddy current. The magnetism assessment device 70 makes a magnetism assessment of the workpiece W as to presence or absence of irregularities and metallographic structure to determine whether the workpiece W is acceptable. The magnetism assessment device 70 includes an adapter 74 connected to the inspection detector 72. The adapter 74 is capable of regulating an alternating current and supplies high frequency alternating current power to the coil of the inspection detector 72. The adapter 74 is connected to a panel (not shown) via wiring (not shown), the panel being capable of providing a display presentation and the like. The magnetism assessment device 70 assesses a surface state of the workpiece W based on a detection result of the inspection detector 72 obtained with the alternating current power being supplied.

The adapter 74 is disposed above the large table 40 and close to the rotation shaft 41 of the large table 40 and is monolithically coupled with the inspection detector 72. As shown in FIG. 7, a rod part 78A of the cylinder mechanism 78 (an element regarded as an "ascending and descending mechanism") is coupled to the adapter 74 via a bracket 76. The rod part 78A is disposed above the inspection detector 72 with the vertical direction as an axial direction. A distal end (lower end) of the rod part 78A is fixed to the bracket 76. A base end (upper end) of the rod part 78A is fixed to a piston part 78B. The piston part 78B is capable of reciprocating with the help of air pressure (fluid pressure in a broad sense) generated in a cylinder part 78C. That is, the inspection detector 72 and the adapter 74 are configured to ascend and descend together when the piston part 78B of the cylinder mechanism 78 reciprocates to move the rod part 78A forward and backward.

The cylinder part 78C is connected to an air supply source 82 via an air direction regulator (solenoid valve or the like) 80. The air direction regulator 80 is connected to a controller 84. The controller 84 is a functional part provided in the above-described control panel, and includes an electronic circuit having, for example, a central processing unit (CPU) and the like. The controller 84 is capable of controlling the air direction regulator 80 to control a change of position of the piston part 78B. In accordance with an operation made on the operation panel 100 (see FIG. 2) by the operator, when the piston part 78B descends to cause the inspection detector 72 to descend to a surface where the workpiece W is placed, the inspection detector 72 is positioned to surround the workpiece W and, at this position, detects electromagnetic properties of the workpiece W after being subjected to shot peening. The magnetism assessment device 70 assesses (determines) the state of the workpiece W based on a detection result of the electromagnetic properties.

As shown in FIG. 6, the blower 64 is disposed, in the inspection chamber 22B, outside the large table 40 (outside in a radial direction of the large table 40) in plan view. A plurality of nozzles 64A of the blower 64 are fixed to the cabinet 12 and are directed toward above the small table 42 that is at a stop position. In the present embodiment, each of the nozzles 64A is directed obliquely downward as an example. Each of the nozzles 64A is connected to a duct (not shown), and the duct is connected to a compressed air supplier (not shown). This configuration allows the blower 64 to blow gas toward the workpiece W held on a small table 42 that has entered the inspection chamber 22B of the plurality of small tables 42. The blower 64 is installed at a position allowing gas to be blown toward the inspection detector 72 located at a descending position (inspection position).

The blower 64 is connected to the controller 84. For example, the controller 84 controls blow timing of the blower 64 such that the blower 64 keeps blowing gas while the inspection detector 72 is descending by the cylinder mechanism 78 shown in FIG. 7 and in a predetermined period of time after the inspection detector 72 is located at the inspection position (up to when the inspection detector 72 starts the inspection of the workpiece W).

On the other hand, as shown in FIG. 6, an inspection detector 92 (second inspection detector) is provided in the inspection chamber 22A located upstream in the rotation direction of the large table 40 relative to the shot chambers 24A and 24B. The inspection detector 92 is also referred to as an inspection probe. That is, in the shot peening device 10 of the present embodiment, a total of two inspection detectors (the inspection detector 72 and the inspection detector 92) are provided in the cabinet 12. The inspection detector 92 that is capable of ascending and descending is disposed above a small table 42 (third placement table) that has entered the inspection chamber 22A of the plurality of small tables 42. The inspection detector 92 inspects the surface properties of the workpiece W held on the small table 42. The inspection detector 92 is formed in a tubular shape. The inspection detector 92 includes a coil for use in assessment of magnetism of the workpiece W and detects electromagnetic properties of the workpiece W. The coil excites an eddy current in the workpiece W.

The magnetism assessment device 90 including the inspection detector 92 shown in FIGS. 6 and 7 includes an adapter 94 connected to the inspection detector 92. The adapter 94 is capable of regulating an alternating current and supplies high frequency alternating current power to the coil of the inspection detector 92. The adapter 94 is connected to a panel (not shown) via wiring (not shown), the panel being capable of providing a display presentation and the like.

The magnetism assessment device 90 provided in the inspection chamber 22A has the same device configuration as the device configuration of the magnetism assessment device 70 provided in the inspection chamber 22B. Note that the magnetism assessment device 70 and the magnetism assessment device 90 are each regarded as a "non-destructive inspection device" in a broad sense. The magnetism assessment device 70 and the magnetism assessment device 90 are capable of relative assessment of an entire to-be-treated surface of the workpiece W in comparison with a preceding process.

The adapter 94 is disposed above the large table 40 and close to the rotation shaft 41 of the large table 40 and is monolithically coupled with the inspection detector 92. The inspection detector 92 and the adapter 94 are configured to ascend and descend together. As shown in FIG. 7, a rod part 178A of a cylinder mechanism 178 is coupled to the adapter 94 via a bracket 176. Note that the configuration for causing the inspection detector 92 and the adapter 94 to ascend and descend is the same as the configuration for causing the inspection detector 72 and the adapter 74 to ascend and descend. Accordingly, with respect to each component of the configuration for causing the inspection detector 92 and the adapter 94 to ascend and descend, a reference numeral that results from adding "1" to the head of a reference numeral of a corresponding component of the configuration for causing the inspection detector 72 and the adapter 74 to ascend and descend is shown in the drawings, and description of the components will be omitted.

An air direction regulator 180 is connected to the controller 84. The controller 84 is capable of controlling the air direction regulator 180 to control a change of position of a piston part 178B. In accordance with an operation made on the operation panel 100 (see FIG. 2) by the operator, when the piston part 178B descends to cause the inspection detector 92 to descend to a surface where the workpiece W is placed, the inspection detector 92 is positioned to surround the workpiece W and, at this position, detects electromagnetic properties of the workpiece W after being subjected to shot peening. The magnetism assessment device 90 assesses (determines) the state of the workpiece W based on a detection result of the electromagnetic properties.

On the other hand, as shown in FIG. 3, a positioning device (first positioning unit) 106 is installed on the device left side (upper side in the drawing), and a positioning device (second positioning unit) 126 is installed on the device right side (lower side in the drawing), both the positioning devices being adjacent to a loading and unloading side (left side in the drawing) of the cabinet 12. The positioning device 106 is provided with a placement part 108. The workpiece W before being loaded into the cabinet 12 is placed on the placement part 108. The placement part 108 is provided in an inspection area 107 defined outside the cabinet 12. The positioning device 106 is capable of positioning the workpiece W placed on the placement part 108 at a predetermined position. On the other hand, the positioning device 126 is provided with a placement part 128. The workpiece W unloaded from the cabinet 12 is placed on the placement part 128. The placement part 128 is provided in an inspection area 127 defined outside the cabinet 12. The positioning device 126 is capable of positioning the workpiece W placed on the placement part 128 at a predetermined position.

A loading conveyor 102 (conveying mechanism in a broad sense) is installed in front of the placement part 108 (left side in the drawing). An unloading conveyor 122 (conveying mechanism in a broad sense) is installed in front of the placement part 128. The loading conveyor 102 and the unloading conveyor 122 are arranged in series with a space provided in the device left-right direction and each convey the workpiece W placed thereon from the device left side to the device right side. Above the loading conveyor 102, a code reader 104 shown in FIG. 1 is provided.

The code reader 104 is provided at a position corresponding to a midpoint in a conveyance direction of the loading conveyor 102. The code reader 104 reads information on the workpiece W placed on the loading conveyor 102. To give further details, for example, when a marking (engraved mark) for product identification is made on the workpiece W with a laser marker in advance, information of the marking is read by the code reader 104 shown in FIG. 1. Note that the code reader 104 need not be provided. A code reader similar to the code reader 104 (see FIG. 1) may be provided above the unloading conveyor 122.

In front of the loading conveyor 102 (the left side in the drawing), a loading-side failure chute 112 is installed. In front of the unloading conveyor 122 (left side in the drawing), an unloading-side failure chute 132 is installed. Between the loading conveyor 102 and the unloading conveyor 122, a conveying robot 114 is further installed as a conveying device.

As shown in FIG. 1, the conveying robot 114 is a six-axis robot and is used for conveying the workpiece W. The conveying robot 114 includes a gripper 114A that grips the workpiece W and an arm 114B that moves the gripper 114A. A conveying robot having a known configuration is applicable as the conveying robot 114; thus, detailed description of the configuration of the conveying robot 114 will be omitted. The conveying robot 114 not only conveys the workpiece W between the inspection area (the inspection area 107 and the inspection area 127) and the placement position on the small table 42 on the loading and unloading side (the loading chamber 20A and the unloading chamber 20B), but also conveys the workpiece W in various manners. Detailed description will be given below.

The conveying robot 114 can convey the workpiece W placed at a predetermined position 102A downstream in the conveyance direction of the loading conveyor 102 to above the placement part 108. The conveying robot 114 can load the workpiece from the placement part 108 into the cabinet 12 and place the workpiece on the small table 42 (fourth placement table) located in the loading chamber 20A, and convey the workpiece W from the placement part 108 into the loading-side failure chute 112. The conveying robot 114 can unload the workpiece W after being subjected to the inspection for detecting electromagnetic properties by the inspection detectors 92 and 72 from the small table 42 (fifth placement table) located in the unloading chamber 20B and place the workpiece W on the placement part 128. The conveying robot 114 can convey the workpiece W from the placement part 128 to an upstream end in the conveyance direction of the unloading conveyor 122 and convey the workpiece W from the placement part 128 to the unloading-side failure chute 132.

A residual stress measuring device 110 (first residual stress measuring device) is provided in the vicinity of the positioning device 106. The residual stress measuring device 110 measures a residual stress on the surface of the workpiece W placed at the predetermined position on the placement part 108 of the inspection area 107. A residual stress measuring device 130 (second residual stress measuring device) is provided in the vicinity of the positioning device 126. The residual stress measuring device 130 measures a residual stress on the surface of the workpiece W placed at the predetermined position on the placement part 128 of the inspection area 127. Note that the residual stress measuring device 110 and the residual stress measuring device 130 are each regarded as a "non-destructive inspection device" in a broad sense. As the residual stress measuring device 110 and the residual stress measuring device 130, for example, a residual stress measuring device disclosed in Japanese Unexamined Patent Publication No. 2017-009356 is applied, and its configuration is known in the above publication; thus, detailed description of the configuration will be omitted.

Here, when a determination unit (not shown) provided in the residual stress measuring device 110 determines that a stress value measured by the residual stress measuring device 110 is acceptable, the conveying robot 114 is configured to move the workpiece W from the placement part 108 to the small table 42 in the loading chamber 20A. When the determination unit (not shown) provided in the residual stress measuring device 110 determines that the stress value measured by the residual stress measuring device 110 is not acceptable, the conveying robot 114 is configured to convey the workpiece W from the placement part 108 into the loading-side failure chute 112.

When a determination unit (not shown) provided in the residual stress measuring device 130 determines that a stress value measured by the residual stress measuring device 130 is acceptable, and the magnetism assessment device 70 determines that the workpiece W is acceptable based on the detection result of the inspection detector 72 in the inspection chamber 22B, the conveying robot 114 is configured to convey the workpiece W from the placement part 128 to the upstream end in the conveyance direction of the unloading conveyor 122. When at least either the determination unit (not shown) provided in the residual stress measuring device 130 determines that the stress value measured by the residual stress measuring device 130 is not acceptable, or the magnetism assessment device 70 determines that the workpiece is not acceptable based on the detection result of the inspection detector 72, the conveying robot 114 is configured to convey the workpiece from the placement part 128 into the unloading-side failure chute 132.

(Action of Shot Peening Device)

Next, description will be given of a series of processes using the shot peening device 10 having the above configuration and actions of the shot peening device 10.

First, as preprocessing, the shot media is charged into the shot media charging part 14 by the operator. The operation panel 100 is operated by the operator as activation preprocessing, and the dust collector 38A, the bucket elevator 36C, and the lower screw conveyor 36B are activated in accordance with the operation. Then, the shot media is conveyed to the device upper section by the bucket elevator 36C, and the shot media thrown out from the bucket elevator 36C is stored in the shot media tank 301 disposed in the device upper section. At this time, crushed shot media and shot media smaller than a standard size are sucked in by the dust collector 38A and classified by the separator 36D (see FIG. 3). Further, an excess of shot media that cannot be stored in the shot media tank 301 is supplied to the vibration sieve 36E, and shot media larger than a mesh size of the wire mesh of the vibration sieve 36E is returned to the lower end section of the bucket elevator 36C.

After the preprocessing and the activation preprocessing, the workpiece W is placed on the loading conveyor 102 by the operator (or a robot). Information of the marking on the workpiece W is read by the code reader 104 (see FIG. 1) while the workpiece W is being conveyed. When being conveyed to a predetermined position on a downstream side in the conveyance direction by the loading conveyor 102, the workpiece W is conveyed to the placement part 108 of the positioning device 106 by the conveying robot 114.

After the workpiece W is positioned by the positioning device 106, the residual stress (stress value) is measured by the residual stress measuring device 110. When the determination unit (not shown) provided in the residual stress measuring device 110 determines that the stress value measured by the residual stress measuring device 110 is acceptable, the workpiece W is placed, by the conveying robot 114, on the small table 42 in the loading chamber 20A. On the other hand, when the determination unit (not shown) provided in the residual stress measuring device 110 determines that the stress value measured by the residual stress measuring device 110 is not acceptable, the workpiece W is conveyed into the loading-side failure chute 112 by the conveying robot 114.

Next, when the operation panel 100 is operated by the operator and then the large table 40 is intermittently rotated by 60° in accordance with the operation, the small table 42 located in the loading chamber 20A is moved to the inspection chamber 22A while holding the workpiece W. Subsequently, when the operation panel 100 (see FIG. 2, hereinafter, description of the reference drawing of the operation panel will be omitted as appropriate) is operated by the operator and then the cylinder mechanism 178 is actuated in accordance with the operation, the inspection detector 92 having a tubular shape descends to a position where the inspection detector 92 surrounds the workpiece W. Then, the inspection detector 92 detects the electromagnetic properties of the workpiece W before being subjected to shot peening, and the magnetism assessment device 90 makes a magnetism assessment of the surface state of the workpiece W based on the detection result to determine whether the workpiece W is acceptable. When the inspection in the inspection chamber 22A is completed, the operation panel 100 is operated by the operator, and then the cylinder mechanism 178 is actuated in accordance with the operation to cause the inspection detector 92 to ascend to above the workpiece W. Then, when the large table 40 is intermittently rotated by 60°, the small table 42 located in the inspection chamber 22A is moved to the shot chamber 24A while holding the workpiece W.

Next, in accordance with an operation made on the operation panel 100 by the operator, shot peening is performed on the workpiece W while the workpiece W is being rotated (to be described in detail later). Subsequently, in accordance with an operation made on the operation panel 100 by the operator, the large table 40 is intermittently rotated by 60°, and the small table 42 located in the shot chamber 24A is moved to the shot chamber 24B while holding the workpiece W. Then, in accordance with an operation made on the operation panel 100 by the operator, shot peening is performed on the workpiece W while the workpiece W is being rotated (to be described in detail later).

Here, a process in which shot peening is performed on the workpiece W while the workpiece W is being rotated will be described with reference to FIG. 8 and the like. In FIG. 8, the shot chamber 24B is shown, and the shot chamber 24A (see FIG. 5) is not shown, but the same process is performed in the shot chamber 24A with the same mechanism as the mechanism of the shot chamber 24B. Therefore, detailed description of the process in the shot chamber 24A will be omitted. Note that the mechanism provided in the shot chamber 24A and the mechanism provided in the shot chamber 24B are the same, but are provided separately.

In a state shown in FIG. 8, when the operation panel 100 is operated by the operator, and the cylinder mechanism 58 is actuated in accordance with the operation, the pressing part 54A descends and holds the workpiece W. At this time, the gear 60A fixed to the pressing shaft 54 engages with the gear 60B, and accordingly the driving force of the drive motor. 62 is transmitted to the pressing shaft 54, thereby rotating the workpiece W and the small table 42 about the rotation shaft 43 (see FIG. 5).

Next, when the operation panel 100 is operated by the operator, and the shot gate 30H is opened in accordance with the operation, the shot media is supplied into the pressure tank 30G When the shot media has been sufficiently stored in the pressure tank 30G the operation panel 100 is operated by the operator, the shot gate 30H is closed in accordance with the operation, and the pressure tank 30G is pressurized. When the pressure tank 30G has been sufficiently pressurized, the operation panel 100 is operated by the operator, and in accordance with the operation, compressed air (air) passes through the mixing valve 30C from the air supplier 30D to the piping part 30B, the cut gate 30F under the pressure tank 30G is opened, and the flow path of the flow regulator 30E is opened. As a result, the shot media flows from the pressure tank 30G to the mixing valve 30C through the cut gate 30F and the flow regulator 30E. Then, the shot media is accelerated by the compressed air flowing through the mixing valve 30C (by air pressure) to pass through the piping part 30B, and is injected (ejected) from the nozzle 30A toward the workpiece W. As a result, shot peening is performed on the workpiece W.

Note that the shot media ejected from the nozzle 30A to the workpiece W passes through a hole (not shown) formed through the sheet member 12Z disposed around the large table 40 in the cabinet 12, and is supplied to the lower screw conveyor 36B through the hopper 36A. Thereafter, the shot media is conveyed to the lower section of the bucket elevator 36C by the lower screw conveyor 36B.

After ejecting the shot media for a predetermined time (for example, 30 seconds in the present embodiment), when the operation panel 100 is operated by the operator, and the cylinder mechanism 58 is actuated in accordance with the operation, the pressing part 54A ascends to release the pressing of the workpiece W.

When a processing work in the shot chamber 24B is completed, the operation panel 100 is operated by the operator, the large table 40 is intermittently rotated by 60° in accordance with the operation, and the small table 42 located in the shot chamber 24B is moved to the inspection chamber 22B while holding the workpiece W. Subsequently, when the operation panel 100 is operated by the operator, and in accordance with the operation, the blower 64 blows gas toward the workpiece W held on the small table 42 located in the inspection chamber 22B and the cylinder mechanism 78 is actuated, the inspection detector 72 having a tubular shape descends to a position where the inspection detector 72 surrounds the workpiece W. Thereafter, blowing of gas by the blower 64 is stopped, and the inspection detector 72 detects the electromagnetic properties of the workpiece W after being subjected to shot peening. Then, the magnetism assessment device 70 makes a magnetism assessment of the surface state of the workpiece W based on the detection result to determine whether the workpiece W is acceptable. When the inspection in the inspection chamber 22B is completed, the operation panel 100 is operated by the operator, and then the cylinder mechanism 78 is actuated in accordance with the operation to cause the inspection detector 72 to ascend to above the workpiece W. Then, when the large table 40 is intermittently rotated by 60°, the small table 42 located in the inspection chamber 22B is moved to the unloading chamber 20B while holding the workpiece W.

Subsequently, the workpiece W is conveyed from the small table 42 located in the unloading chamber 20B to the placement part 128 of the positioning device 126 by the conveying robot 114 (see FIG. 3). After the workpiece W is positioned by the positioning device 126, the residual stress (stress value) is measured by the residual stress measuring device 130.

Then, when the determination unit (not shown) provided in the residual stress measuring device 130 determines that the stress value measured by the residual stress measuring device 130 is acceptable, and the magnetism assessment device 70 determines that the workpiece W is acceptable based on the detection result of the inspection detector 72 in the inspection chamber 22B, the conveying robot 114 conveys the workpiece W from the placement part 128 to the upstream end in the conveyance direction of the unloading conveyor 122. Further, when at least either the determination unit (not shown) provided in the residual stress measuring device 130 determines that the stress value measured by the residual stress measuring device 130 is not acceptable, or the magnetism assessment device 70 determines that the workpiece W is not acceptable based on the detection result of the inspection detector 72 in the inspection chamber 22B, the conveying robot 114 conveys the workpiece W from the placement part 128 into the unloading-side failure chute 132. On the other hand, the workpiece W conveyed to the upstream end in the conveyance direction of the unloading conveyor 122 is conveyed by the unloading conveyor 122.

In order to stop the operation of the shot peening device 10, the operation panel 100 is operated by the operator, and respective motors of the dust collector 38A, the lower screw conveyor 36B, and the bucket elevator 36C are stopped in accordance with the operation. Note that when the shot media runs short with the shot peening device 10 in operation, shot media is resupplied from the shot media charging part 14 by the operator.

Note that, although, in the present embodiment, the operator sequentially operates the operation panel 100 to bring the shot peening device 10 into operation, for example, the shot peening device 10 may be configured to automatically perform the above-described operation. That is, for example, the shot peening device 10 may include a sequence control circuit for sequentially executing the above-described series of actions in the control panel including the operation panel 100 and be configured to operate in accordance with the sequence. In order to accomplish the automatic operation with such a configuration, for example, an automatic operation button of the operation panel 100 is pressed by the operator, an automatic operation signal is input to the sequence control circuit in accordance with the operation, and then an action command is transmitted from the sequence control circuit to each drive unit, thereby activating the automatic operation.

(Operation and Effect of Embodiment)

Next, operations and effects of the above embodiment will be described.

In the shot peening device 10 of the present embodiment, the inspection detector 92 is provided in the inspection chamber 22A located upstream in the rotation direction of the large table 40 relative to the shot chambers 24A and 24B, and the inspection detector 72 is provided in the inspection chamber 22B located downstream in the rotation direction of the large table 40 relative to the shot chambers 24A and 24B. The inspection detector 92 that is capable of ascending and descending is disposed above the small table 42 that has entered the inspection chamber 22A, and the inspection detector 72 that is capable of ascending and descending is disposed above the small table 42 that has entered the inspection chamber 22B. Then, the inspection detector 92 and the inspection detector 72 each inspect the surface properties of the workpiece W held on the small table 42.

As described above, in a period from loading of one workpiece W onto one of the small tables 42 until unloading of the workpiece W from the small table 42 after being subjected to the ejection processing (machining) and inspection, another workpiece W can be loaded and unloaded, and subjected to the ejection processing (machining) and inspection. Further, since the inspection of the surface properties of the workpiece W is performed in a chamber other than the shot chambers 24A and 24B, it is not necessary to make the structure inside the shot chambers 24A and 24B complex.

As described above, with the shot peening device 10 of the present embodiment, it is possible to shorten the cycle time and to avoid the structure inside the shot chambers 24A and 24B being complex even with the configuration where the inspection detectors 72 and 92 are built in the shot peening device 10.

Further, in the present embodiment, it is possible not only to inspect the surface properties of the workpiece W after being subjected to shot peening (that is, quality check after shot peening), but also to inspect the surface properties of the workpiece W before being subjected to shot peening (that is, quality check before shot peening). This allows determination of whether a defect is present in a preceding process to be made, facilitating a finding of a cause of the defect. Further, in the present embodiment, all workpieces W are subjected to the inspection before and after being subjected to shot peening, so that a tendency of variations with time before and after shot peening can be analyzed, and a malfunction (such as failure or wearing out) in the shot peening device 10 can be checked.

Further, in the present embodiment, the inspection chamber 22B doubles as an air blow chamber. In other words, the inspection chamber 22B is provided with the inspection detector 72 and the blower 64, and the blower 64 is capable of blowing gas toward the workpiece W held on the small table 42 that has entered the inspection chamber 22B. Therefore, even when shot media and dust adhere to the workpiece W, the shot media and dust can be blown off (removed) by the gas blown from the blower 64 to the workpiece W with the inspection detector 72 retracted to above the workpiece W. This allows the surface properties of the workpiece W to be inspected with high accuracy.

Further, in the present embodiment, the blower 64 is set at a position allowing gas to be blown toward the inspection detector 72 in a descending state. Therefore, even when dust adheres to the inspection detector 72, the dust can be blown off (removed) by gas blown from the blower 64. This makes it possible to prevent or effectively suppress accumulation of dust on the inspection detector 72. As a result, the inspection detector 72 is kept in a state with high inspection accuracy (almost the same state as the initial state), allowing the surface properties of the workpiece W to be inspected with higher accuracy.

Further, in the present embodiment, the dust collector 38A sucks in air containing dust in the cabinet 12. Therefore, when dust and the like on the workpiece W are blown off by gas blown from the blower 64 in the inspection chamber 22B, the dust and the like blown off (blown up) in the inspection chamber 22B are sucked in, by the dust collector 38A, together with air through the shot chamber 24B, the duct 38C1, the settling chamber 38D, and the duct 38C2. This allows the surface properties of the workpiece W to be inspected with higher accuracy. Note that in a case where a duct coupling the dust collector 38A with the cabinet 12 is connected to an upper section of a chamber other than the shot chambers in the cabinet 12, gas in the shot chambers may flow (mix) into the chamber to which the duct is connected while the dust collector 38A is in suction operation. However, such a phenomenon does not occur with the configuration of the present embodiment.

Further, in the present embodiment, as shown in FIG. 7, the inspection detectors 72 and 92 ascend and descend together with the adapters 74 and 94, respectively, so that detection performance of the inspection detectors 72 and 92 can be maintained with a simple configuration. To give further details, in the present embodiment, for example, the inspection detectors 72 and 92 are monolithically coupled with the adapters 74 and 94, respectively, so that a distance between the inspection detectors 72 and 92 and the adapters 74 and 94 is short. This allows high frequency alternating current power from the adapters 74 and 94 to be well supplied to the coils of the inspection detectors 72 and 92, allowing the detection performance of the inspection detectors 72 and 92 to be maintained with a simple configuration.

Further, in the present embodiment, the adapters 74 and 94 are disposed above the large table 40 and in the vicinity of the rotation shaft 41 of the large table 40, so that maintenance work on an inner surface side of the inspection chamber 22B and an inner surface side of the inspection chamber 22A can be easily made.

Further, in the present embodiment, the adapter 74 is disposed above the large table 40 and in the vicinity of the rotation shaft 41 in the inspection chamber 22B, whereas the blower 64 is disposed outside the large table 40 in plan view. This makes it possible to prevent gas blown out from the blower 64 from being obstructed by the adapter 74.

Further, in the present embodiment, the workpiece W before being loaded into the cabinet 12 is placed on the placement part 108. Then, the residual stress measuring device 110 measures the residual stress on the surface of the workpiece W placed at the predetermined position of the placement part 108. Further, the conveying robot 114 loads the workpiece W from the placement part 108 into the cabinet 12, places the workpiece W on the small table 42 (see FIG. 5), and unloads the workpiece W whose surface properties have been inspected by the inspection detectors 72 and 92 (see FIG. 6) from the small table 42 (see FIG. 5) in the cabinet 12 on the placement part 128. Then, the residual stress measuring device 130 measures the residual stress on the surface of the workpiece W placed at the predetermined position of the placement part 128. On the other hand, the inspection detectors 72 and 92 detect the electromagnetic properties of the workpiece W.

This allows the electromagnetic properties of the workpiece W before and after being subjected to shot peening to be detected and the residual stress on the surface of the workpiece W before and after being subjected to shot peening to be measured.

Further, in the present embodiment, the detection (and the magnetism assessment) of the electromagnetic properties of the workpiece W and the measurement (and assessment) of the residual stress on the surface of the workpiece W are performed by non-destructive inspection, allowing all workpieces W to be inspected.

Note that, in the present embodiment, as shown in FIG. 8, the drive mechanism for rotating the workpiece W and the small table 42 is provided in the pressing mechanism 52, and the drive motor 62 and the like are disposed above the cabinet 12. This makes it possible to widen an effective space below the large table 40, and to prevent the shot media from coming into contact with the drive motor 62 and the like, so that the drive motor 62 and the like are less prone to fail, and furthermore maintenance work on the nozzle 30A, the piping part 30B, the lower screw conveyor 36B, the drive motor 36G, and the like can be easily made.

Additional Description of Embodiment

Note that as a modification of the above embodiment, as shown in FIG. 7, a nozzle 66A (indicated by a long dashed double-short dashed line) of a blower 66 may be fixed to the adapter 74. The blower 66 is capable of blowing gas toward the workpiece W held on the small table 42 that has entered the inspection chamber 22B. According to such a modification, since the nozzle 66A of the blower 66 ascends and descends together with the adapter 74, it is possible to effectively use a space in the inspection chamber 22B. Further, in such a modification, for example, in descending of the inspection detector 72 for inspection of the workpiece W using the inspection detector 72, a configuration may be employed in which the inspection detector 72 is temporarily stopped while descending, gas is blown toward the workpiece W from the nozzle 66A of the blower 66, and then the inspection detector 72 is caused to descend to the inspection position and inspects the workpiece W. Note that the blower 66 of the above modification may be provided in place of the blower 64 of the above embodiment or may coexist with the blower 64 of the above embodiment. In a case where the blower 66 of the above modification coexists with the blower 64 of the above embodiment, it is possible to blow off the shot media and dust adhering to the workpiece W more effectively.

Further, in the above embodiment, the cylinder mechanisms 78 and 178 for causing the inspection detectors 72 and 92 to ascend and descend are air cylinder mechanisms. The cylinder mechanisms 78 and 178 may be, rather than such air cylinder mechanisms, servo cylinder mechanisms (electric cylinder mechanisms) including an electric servomotor.

Further, in the present embodiment, the inspection detectors 72 and 92 are used for magnetism assessment of the workpiece W. However, the inspection detectors 72 and 92 may be used for inspection of the surface properties of the workpiece W other than the magnetism assessment, like, for example, a residual stress measuring device similar to the residual stress measuring device 110 and the residual stress measuring device 130.

Further, in the above embodiment, six chambers and six small tables 42 in total are provided in the cabinet 12. As a modification of the above embodiment, a loading and unloading chamber where the workpiece W is loaded into and unloaded from may be provided in place of the loading chamber 20A and the unloading chamber 20B. Further, the inspection chamber 22A and the shot chamber 24A may be eliminated. That is, three chambers (the loading and unloading chamber, the shot chamber 24B, and the inspection chamber 22B) in total may be provided in the cabinet 12. In this case, three small tables 42 may be provided. Further, the inspection chamber 22A may be provided in the above modification. That is, four chambers (the loading and unloading chamber, the inspection chamber 22A, the shot chamber 24B, and the inspection chamber 22B) in total may be provided in the cabinet 12. In this case, four small tables 42 may be provided. That is, the numbers of chambers and small tables 42 in the cabinet 12 are not limited to the example of the above embodiment.

As another modification of the above embodiment, the number of chambers in the cabinet 12 may be eight, for example. For example, two inspection chambers may be further provided in the cabinet 12. Residual stress measuring devices similar to the residual stress measuring devices 110 and 130 are provided as inspection detectors in the two inspection chambers.

Further, in the above embodiment, the inspection detector 72 and the blower 64 are provided in the inspection chamber 22B, and the inspection chamber 22B doubles as an air blow chamber. The blower 64 need not be provided in the inspection chamber 22B.

Further, in the above embodiment, the inspection detectors 72 and 92 and the adapters 74 and 94 are configured to ascend and descend together, respectively. As a modification of the above embodiment, a configuration may be employed in which only the inspection detectors 72 and 92 ascend and descend, and the adapters 74 and 94 are arranged away from the inspection detectors 72 and 92 and neither ascend nor descend. To give further details, for example, the magnetism assessment device (surface property inspection device) may include an inspection detector, an adapter, a panel capable of providing a display presentation and the like, and a reference detector. In this surface property inspection device, the inspection detector and the reference detector may be configured to ascend and descend together, and the adapter and the panel may be arranged away from the inspection detector and neither ascend nor descend. The reference detector detects a reference state that serves as a reference to be compared with an output from the inspection detector. Note that the surface property inspection device including the inspection detector and the reference detector corresponds to a device disclosed in Japanese Patent No. 5877505 and the like, for example.

Further, in the above embodiment, the adapters 74 and 94 are arranged above the large table 40 and in the vicinity of the rotation shaft 41 of the large table 40. As a modification of the above embodiment, the adapters 74 and 94 connected to the inspection detectors 72 and 92 may be arranged above the large table 40 and away from the rotation shaft 41 of the large table 40.

Further, in the above embodiment, the blower 64 is disposed outside the large table 40 in plan view, but the blower 64 may be disposed close to the rotation shaft 41 of the large table 40 in plan view.

Further, in the above embodiment, as shown in FIG. 8, a drive mechanism for rotating the workpiece W and the small table 42 is provided in the pressing mechanism 52. The drive mechanism for rotating the workpiece W and the small table 42 may be coupled to the rotation shaft 43 of the small table 42 as in the mechanism disclosed in Japanese Unexamined Patent Publication No. 2012-101304, for example.

Further, in the above embodiment, the shot peening device 10 has a component part including the placement part 108, the placement part 128, the conveying robot 114, the residual stress measuring device 110, and the residual stress measuring device 130 close to the loading and unloading side of the cabinet 12, but the shot peening device 10 need not have such a component part. Further, as a modification of the above embodiment, the shot peening device 10 need not include the placement part 108 and the residual stress measuring device 110, and may include the placement part 128 and the residual stress measuring device 130. Further, the shot peening device 10 need not include the placement part 128 and the residual stress measuring device 130, and may include the placement part 108 and the residual stress measuring device 110. As another modification of the above embodiment, one residual stress measuring device may measure both the residual stress on the surface of the workpiece W before being loaded into the cabinet 12 and the residual stress on the surface of the workpiece W unloaded from the cabinet 12. In the above embodiment, the inspection area is constituted by the inspection area 107 and the inspection area 127, but the inspection area may be constituted by one inspection area.

Further, in the above embodiment, the positioning devices 106 and 126 for use in positioning of the workpiece W at the predetermined position are provided. As a modification of the above embodiment, the conveying robot 114 may position the workpiece W at the predetermined position. In this case, the conveying robot 114 may place the workpiece W at the predetermined positions of the placement parts 108 and 128 of the inspection areas 107 and 127, or the conveying robot 114 may maintain the workpiece W positioned at the predetermined positions of the inspection areas 107 and 127 while holding the workpiece W, and, in this state, the residual stress measuring device (the residual stress measuring device 110 and the residual stress measuring device 130) may measure the residual stress on the surface of the workpiece W.

Further, in the above embodiment, the shot treatment device corresponds to the shot peening device 10, but the shot treatment device may be, for example, a shot blasting device or a device including a shot peening device and a shot blasting device.

Further, in the above embodiment, the ejector corresponds to the injector 30 of an air nozzle type that injects the shot media with pressure from the nozzle 30A together with compressed air. However, the ejector may be a different ejector such as an ejector of a centrifugal force type that accelerates the shot media by centrifugal force to eject the shot media, for example.

Note that the above embodiment and modifications may be combined as appropriate for implementation.

Although an example of the present disclosure has been described above, it goes without saying that the present invention is not limited to the above description, and it is obvious that various modifications can be made without departing from the scope of the present invention.

REFERENCE SIGNS LIST

10 shot peening device (shot treatment device)
12 cabinet
20A loading chamber (chamber other than shot chamber)
20B unloading chamber (chamber other than shot chamber)
22A inspection chamber (chamber other than shot chamber)
22B inspection chamber (chamber other than shot chamber, air blow chamber)
24A shot chamber
24B shot chamber
30 injector (ejector)
38A dust collector
40 large table (rotary table)
41 rotation shaft (first rotation shaft)
42 small table (placement table)
43 rotation shaft (second rotation shaft)
64 blower
66 blower
66A nozzle
72 inspection detector
74 adapter
92 inspection detector
94 adapter
107 inspection area (inspection area)
108 placement part
110 residual stress measuring device (residual stress measuring device)
114 conveying robot (conveying device)
127 inspection area (inspection area)
128 placement part
130 residual stress measuring device (residual stress measuring device)

The invention claimed is:

1. A shot treatment device comprising:
a cabinet;
a plurality of chambers provided in the cabinet;
a rotary table provided in the cabinet and rotatable in a first rotation direction about a first rotation shaft extending along a vertical direction;
a plurality of placement tables arranged at intervals in a circumferential direction on an upper surface of the rotary table, each of the plurality of placement tables being configured to receive and hold a workpiece;
an ejector configured to eject shot media; and
a first inspection detector configured to inspect surface properties of the workpiece, wherein
the plurality of chambers are arranged side by side around the first rotation shaft,
the plurality of chambers include a shot chamber in which shot media is ejected to a workpiece and a first inspection chamber provided downstream in the first rotation direction from the shot chamber, the ejector ejects shot media to a workpiece held on a first placement table that has entered the shot chamber of the plurality of placement tables, and the first inspection detector capable of ascending and descending is disposed above a second placement table that has entered the first inspection chamber of the plurality of placement tables and inspects surface properties of a workpiece held on the second placement table.

2. The shot treatment device according to claim 1, further comprising a second inspection detector configured to inspect the surface properties of the workpiece, wherein the plurality of chambers further include a second inspection chamber provided upstream in the first rotation direction from the shot chamber, and the second inspection detector capable of ascending and descending is disposed above a third placement table that has entered the second inspection chamber of the plurality of placement tables and inspects surface properties of a workpiece held on the third placement table.

3. The shot treatment device according to claim 2, further comprising a blower provided in the first inspection chamber and capable of blowing gas toward the workpiece held on the second placement table.

4. The shot treatment device according to claim 3, wherein the blower is installed at a position allowing gas to be blown toward the first inspection detector.

5. The shot treatment device according to claim 4, further comprising a dust collector configured to suck in air containing dust in the cabinet.

6. The shot treatment device according to claim 3, further comprising a dust collector configured to suck in air containing dust in the cabinet.

7. The shot treatment device according to claim 3, further comprising an ascending and descending mechanism configured to cause the first inspection detector to ascend and descend together with an adapter connected to the first inspection detector.

8. The shot treatment device according to claim 1, further comprising a blower provided in the first inspection chamber and capable of blowing gas toward the workpiece held on the second placement table.

9. The shot treatment device according to claim 8, wherein the blower is installed at a position allowing gas to be blown toward the first inspection detector.

10. The shot treatment device according to claim 9, further comprising a dust collector configured to suck in air containing dust in the cabinet.

11. The shot treatment device according to claim 9, further comprising an ascending and descending mechanism configured to cause the first inspection detector to ascend and descend together with an adapter connected to the first inspection detector.

12. The shot treatment device according to claim 8, further comprising a dust collector configured to suck in air containing dust in the cabinet.

13. The shot treatment device according to claim 8, further comprising an ascending and descending mechanism configured to cause the first inspection detector to ascend and descend together with an adapter connected to the first inspection detector.

14. The shot treatment device according to claim 13, wherein the adapter is disposed above the rotary table and close to the first rotation shaft.

15. The shot treatment device according to claim 14, wherein the blower is disposed outside the rotary table in plan view.

16. The shot treatment device according to claim 13, wherein a nozzle of the blower is fixed to the adapter.

17. The shot treatment device according to claim 1, further comprising an ascending and descending mechanism configured to cause the first inspection detector to ascend and descend together with an adapter connected to the first inspection detector.

18. The shot treatment device according to claim 1, further comprising:

a conveying device configured to convey a workpiece from an inspection area defined outside the cabinet to a placement position; and a residual stress measuring device configured to measure a residual stress on a surface of a workpiece placed in the inspection area, wherein the plurality of chambers further include a loading chamber for use in loading of a workpiece into the cabinet, the placement position is a position on a fourth placement table located in the loading chamber of the plurality of placement tables, and the first inspection detector detects electromagnetic properties of a workpiece.

19. The shot treatment device according to claim 18, further comprising:

a first placement part on which a workpiece before being loaded into the cabinet is placed; and, a second placement part on which a workpiece unloaded from the cabinet is placed, wherein the plurality of chambers further include an unloading chamber for use in unloading of a workpiece from the cabinet, the conveying device loads a workpiece from the first placement part into the cabinet and places the workpiece on the fourth placement table, and unloads a workpiece whose electromagnetic properties have been inspected by the first inspection detector from a fifth placement table located in the unloading chamber of the plurality of placement tables and places the workpiece on the second placement part, and the residual stress measuring device includes a first residual stress measuring device configured to measure a residual stress on a surface of a workpiece placed on the first placement part, and a second residual stress measuring device configured to measure a residual stress on a surface of a workpiece placed on the second placement part.

20. The shot treatment device according to claim 1, wherein each of the plurality of placement tables is rotatable about a second rotation shaft parallel to the first rotation shaft.

* * * * *